Dec. 16, 1958 B. D. LOUGHLIN 2,864,951

CHROMINANCE-SIGNAL COMPONENT-SELECTION SYSTEM

Filed Dec. 8, 1954 2 Sheets-Sheet 1

Dec. 16, 1958 B. D. LOUGHLIN 2,864,951

CHROMINANCE-SIGNAL COMPONENT-SELECTION SYSTEM

Filed Dec. 8, 1954 2 Sheets-Sheet 2

United States Patent Office 2,864,951

Patented Dec. 16, 1958

2,864,951

CHROMINANCE-SIGNAL COMPONENT-SELECTION SYSTEM

Bernard D. Loughlin, Lynbrook, N. Y., assignor to Hazeltine Research, Inc., Chicago, Ill., a corporation of Illinois Application December 8, 1954, Serial No. 473,916

7 Claims. (Cl. 250—27)

*General*

This invention relates to systems of the type which selects one or more chrominance-signal components along predetermined axes of a received chrominance subcarrier signal. Such systems have particular utility in color-television receivers utilizing one-gun sequential color displays.

Applicant has previously described systems for selecting chrominance-signal components along predetermined axes of a chrominance subcarrier signal in an article entitled "Processing of the NTSC Color Signal for One-Gun Sequential Color Displays," Proceedings of the I. R. E., January 1954. Such systems are also described and claimed in applicant's copending applications Serial No. 384,237, now Patent No. 2,734,940, entitled "Image-Reproducing System for A Color-Television Receiver," filed October 5, 1953; Serial No. 466,999, entitled "Signal-Modifying Apparatus," filed November 5, 1954, now Patent No. 2,814,778, granted November 26, 1957, and Serial No. 473,914, entitled "Chrominance-Signal Component-Selection System," filed concurrently herewith. These systems are particularly useful in converting a received chrominance subcarrier signal to the form required to reproduce a faithful color picture on a one-gun sequential cathode-ray tube color display.

While the chrominance-signal component-selection systems previously described are entirely satisfactory with respect to operability and performance, the present invention relates to an improvement of such systems which provides increased gain therefor.

It is an object of the present invention, therefore, to provide a new and improved chrominance-signal component-selection system of simple and inexpensive construction capable of providing increased gain.

In accordance with a particular form of the invention, in a color-television receiver, a system for selecting one or more chrominance-signal components along predetermined axes of a received chrominance subcarrier signal comprises first circuit means for supplying a chrominance subcarrier signal. The system also includes phase-selective circuit means coupled to the first circuit means and having a pair of output circuits for developing in the output circuits phase-selected current components representative of chrominance-signal components derived along a first set of predetermined axes of the subcarrier signal. The system also includes circuit means for intercoupling the output circuits in such circuit as to develop augmented current components representative of chrominance-signal components derived along a second set of predetermined axes of the subcarrier signal.

For a better understanding of the present invention, together with other and further objects thereof, reference is had to the following description taken in connection with the accompanying drawings, and its scope will be pointed out in the appended claims.

Referring to the drawings.

Figure 1:
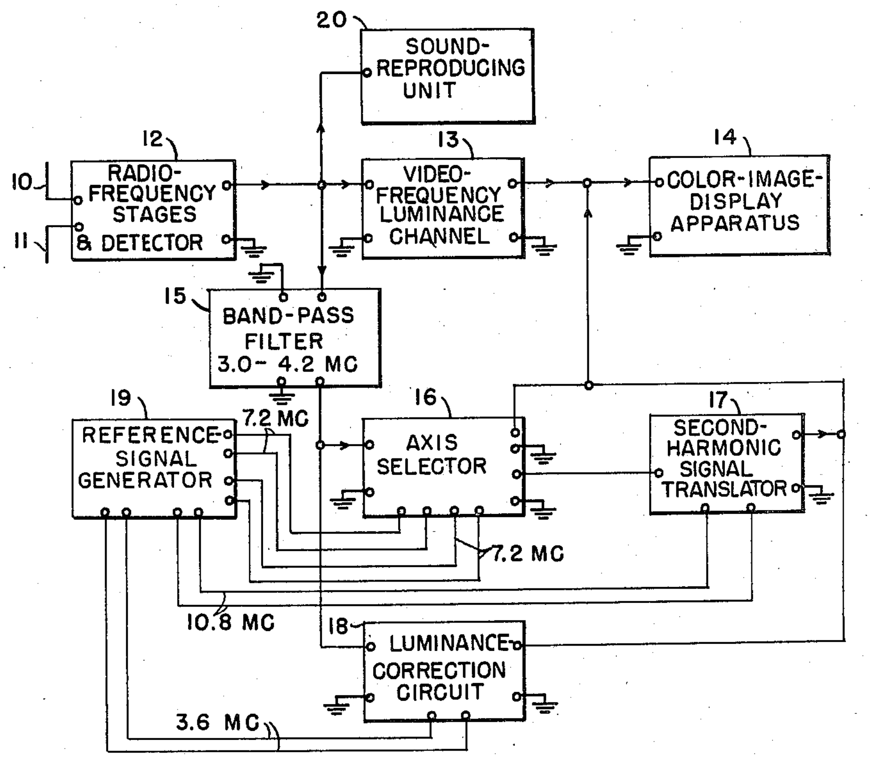
Fig. 1 is a schematic circuit diagram of a color-television receiver employing a chrominance-signal component-selection system constructed in accordance with the invention.

*Description and operation of Fig. 1 receiver*

The Fig. 1 color-television receiver comprises an antenna system 10, 11 coupled to radio-frequency stages and detector 12 for applying thereto a received color-television signal. The radio-frequency stages and detector 12 amplify the received signal and detect the video-frequency modulation components thereof as well as derive a sound intermediate-frequency signal. The sound signal is applied to a sound-reproducing unit 20 of conventional construction for amplification and translation to sound.

The unit 12 applies the detected video-frequency signal to a video-frequency luminance channel 13 which amplifies the luminance component and applies it to a color image-display apparatus 14 which may be, for example, of the Chromatron type, which is a well-known display employing a single-gun cathode-ray tube having strip phosphors and controlling the cathode-ray beam by a grid structure adjacent the phosphors. There are associated with the display apparatus 14 suitable line-scan and field-scan generators (not shown) responsive to synchronizing components of the received television signal.

The unit 12 also applies the detected video-frequency signal to a band-pass filter 15 having a pass band of, for example, 3.0–4.2 megacycles which is effective to translate the chrominance subcarrier signal. The filter 15 applies the chrominance subcarrier signal to an axis selector 16, constructed in accordance with the invention, for selecting chrominance-signal components along the $aR-bB-cG$ and $xG-yR-zB$ axes of the chrominance subcarrier signal.

The significance of selecting chrominance-signal components along the $aR-bB-cG$ and $xG-yR-zB$ axes may best be understood with reference to the above-mentioned I. R. E. article where it is explained that it is desirable to select chrominance-signal components along the $R-B$ and $G-.5R-.5B$ axes. The $R-B$ and $G-.5R-.5B$ axes are axes suitable for chrominance-component selection when an idealized display is employed in which the chromaticities of the effective primary colors of the display have desired values. It is well known, however, that the chromaticities of the effective primaries of the display may differ from the desired chromaticities because of, for example, secondary electron scattering within the display. Exact compensation for the effective primary color differences to produce correct colors appears to involve more complex circuits than are desirable for present receivers. However, a substantial correction can be accomplished by selecting chrominance-signal components along the $aR-bB-cG$ and $xG-yR-zB$ axes where the factors $a$, $b$, $c$ and $x$, $y$, $z$ are determined by the effective primaries of the display with relation to the desired primaries. For some currently available focus-mask phosphor-strip tubes, the selected axes are in quadrature.

Referring again to Fig. 1, the axis selector 16 applies the $xG-yR-zB$ component to a second-harmonic signal translator 17 which may be of a type described in the above-mentioned article. The $aR-bB-cG$ chrominance component at subcarrier frequency and the $xG-yR-zB$ component at second-harmonic frequency are then applied by units 16 and 17, respectively to the color image-display apparatus 14 to develop the desired chromaticity of the reproduced image.

The band-pass filter 15 also applies the chrominance subcarrier signal to a luminance-correction circuit 18 which derives a luminance-correction signal in accordance with principles explained in the above-mentioned article for application to the color image-display apparatus 14. Because of the alteration of effective primary colors caused by electron scattering as previously explained, the luminance-correction signal derived by the circuit 18 may be defined as a component selected along an axis $-mR-nG+oB$. The factors $m$, $n$, $o$ are determined by the effective primary colors of the tube in use. For an idealized one-gun symmetrically sampled sequentially operated tube in which the effective colors are the same as the primary colors corresponding to the signals $E_R$, $E_G$, and $E_B$, the luminance-correction signal is an $M-Y$ signal where:

$$M=\tfrac{1}{3}(E_R+E_G+E_B) \qquad (1a)$$

$$Y=.59E_G+.30E_R+.11E_B \qquad (1b)$$

The luminance signal and luminance-correction signal effectively combine to develop a monochrome signal which causes the reproduction of a picture having the proper luminance components on the display tube utilized. The operations of units 16, 17, and 18 require the application thereto of reference signals of frequencies of 7.2, 10.8, and 3.6 megacycles, respectively. These signals are supplied by a reference-signal generator 19 which may be operatively synchronized with the color burst of the transmitted signal by means not shown. The operation of the generator 19 in connection with unit 16 will be more fully described hereinafter while the operation of the generator 19 in connection with units 17 and 18 is described in the above-mentioned article. All of the foregoing units, with the exception of unit 16, may be of conventional construction and operation.

Figure 2:
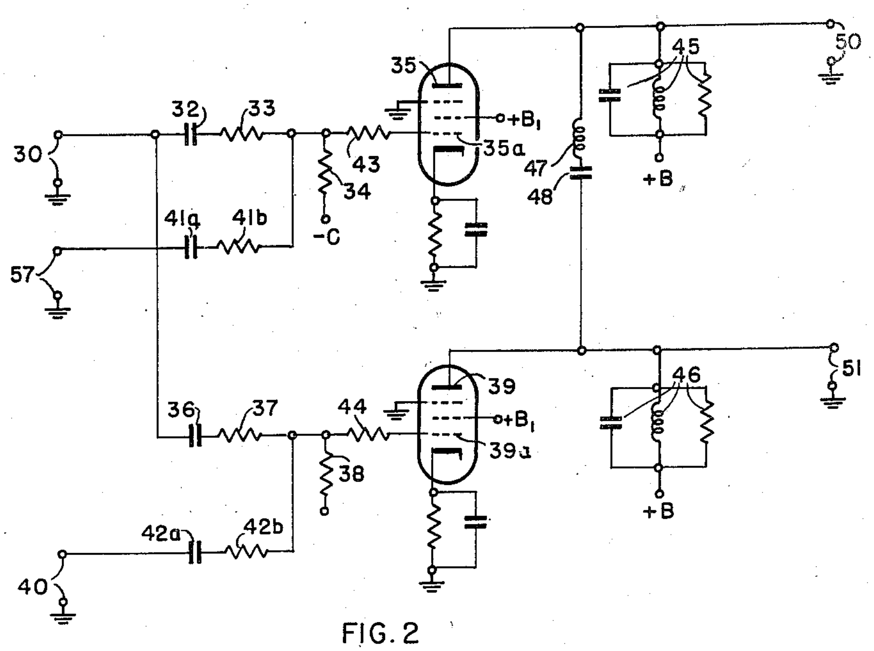
Fig. 2 is a detailed circuit diagram of the chrominance-signal component-selection system of the Fig. 1 receiver.

*Description of Fig. 2 system*

Referring now more particularly to Fig. 2 of the drawings, there is represented a system, constructed in accordance with the invention, for selecting one or more chrominance-signal components along predetermined axes of the received chrominance subcarrier signal. The system comprises first circuit means for supplying a chrominance subcarrier signal and preferably includes second circuit means for supplying a reference signal having a frequency equal to an integral multiple of the frequency of the subcarrier signal. More particularly, the first circuit means comprises, for example, a pair of input terminals 30, 30 connected to the band-pass filter 15 of Fig. 1 and included with a coupling condenser 32, an isolating resistor 33, and grid-leak resistors 34, 43 in the control electrode-cathode circuit of a tube 35. The terminals 30, 30 are similarly included with a coupling condenser 36, isolating resistor 37, and grid-leak resistors 38, 44 in the control electrode-cathode circuit of a tube 39. The second circuit means includes, for example, pairs of input terminals 57, 57 and 40, 40 coupled to the tubes 35 and 39, respectively, through coupling condenser and isolating resistor networks 41*a*, 41*b* and 42*a*, 42*b*, respectively, for supplying reference signals preferably having a second-harmonic frequency relation to the subcarrier signal and 180° out of phase with each other.

The system preferably also includes circuit means coupled to the first and second circuit means and having a pair of output circuits for developing in the output circuits current components representative of chrominance-signal components derived along a first set of predetermined axes of the subcarrier signal. This circuit means comprises the tubes 35 and 39 which may, for example, be conventional five-electrode tubes having anode-cathode output circuits including resonant circuits 45, 46 tuned to the subcarrier signal frequency for developing primary current components in quadrature-phase relation which represent chrominance-signal components derived along the first set of predetermined axes of the subcarrier signal. The inner control electrodes 35*a*, 39*a* of the tubes 35, 39 are effective to vary the currents through the tubes and, because of operation over a nonlinear region of the control electrode-bias anode current characteristic of the tubes, the control electrodes are effective as gain-control means for varying the gain in accordance with the reference signals applied thereto.

The system also includes circuit means for intercoupling the output circuits in such circuit as to develop augmented current components representative of chrominance-signal components derived along a second set of predetermined axes of the subcarrier signal. This circuit means preferably comprises frequency-responsive circuit means including an inductor 47 and condenser 48 series-resonant at the second harmonic of the subcarrier signal and serving as a capacitive coupling unit at the subcarrier frequency for providing, in conjunction with the resonant circuits 45, 46, a quadrature-phase shift of each of the developed current components with respect to the other and for combining linearly each current component with the other phase-shifted component to develop augmented current components derived along a second set of predetermined axes of the subcarrier signal which is phase-shifted from the first set of axes.

*Operation of Fig. 2 system*

Considering now the operation of the Fig. 2 chrominance-signal component-selection system, a reference signal having a frequency of, for example, approximately 7.2 megacycles is applied by the reference-signal generator 19 of Fig. 1 to the tube 35 of Fig. 2 via terminals 57, 57 while a reference signal of the same frequency but opposite phase is applied to the tube 39 via terminals 40, 40. The tubes 35 and 39 are so biased that the reference signals are effective to vary the bias of the tubes over a nonlinear region of the control electrode-bias anode current characteristic. For example, the reference signals may have sufficient amplitude to drive the tubes to cutoff during negative half cycles and to drive the tubes into conduction during positive half cycles. In this manner, the reference signals are effective to vary the gain of the tubes 35 and 39 at a 7.2 megacycle rate.

The chrominance subcarrier signal is also applied to the control electrodes of the tubes 35 and 39 via terminals 30, 30. Because of the gain variations of the tubes 35 and 39, the currents at the anodes of the tubes comprise 7.2 megacycle pulses varying in amplitude at a 3.6 megacycle rate. Because the gain variations of the tubes 35 and 39 are 180° out of phase with each other due to the phasing of the reference signals applied thereto, the 3.6 megacycle components of the anode-current variations have a quadrature-phase relation at 3.6 megacycles. In other words, the tube 35 is effective to translate a component along a predetermined axis of the subcarrier signal while suppressing the quadrature component because of the gain variation thereof, and the tube 39, because of its gain variation, is effective to translate the quadrature component while suppressing the component translated by the tube 35.

It may be shown that because of wide angle conduction, the anode currents of the tubes also include undesired quadrature components to some extent and thus are not completely independent. This may be appreciated by considering each tube as a current switch to which there are applied sine- and cosine-current components representing the modulated subcarrier signal. By means of a Fourier analysis, the amplitude of the frequency components which appear in the output circuit after translation by the switch may be derived. With, for example, a 50 percent. duty cycle of the current-deriving operations by the tubes 35 and 39, the primary current component at 3.6 megacycles at each anode has an amplitude approximately four times the amplitude of the undesired quadrature component. Such operation is designated incomplete axis selection.

Figure 3A:
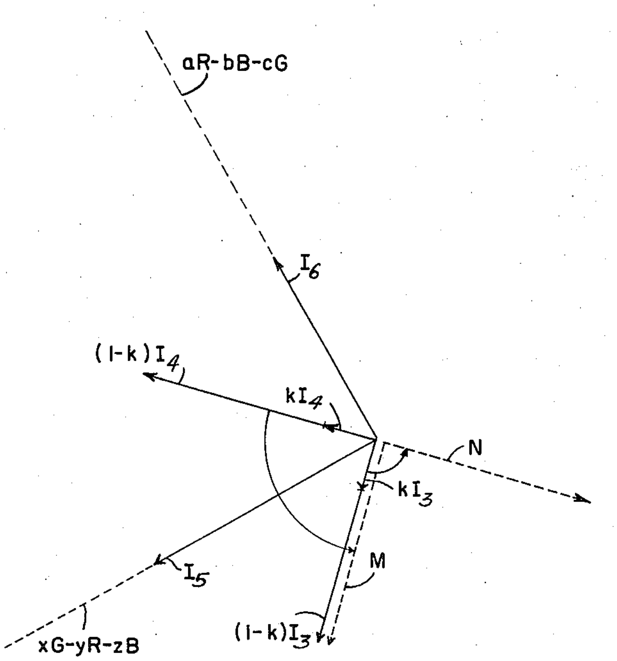
Figs. 3*a*, 3*b*, and 3*c* are vector diagrams used to aid in explaining the operation of the Fig. 2 system.

Referring now more particularly to Fig. 3*a*, the chrominance subcarrier signal, as it controls the space current of the tubes 35 and 39, may, for simplicity of explanation, be considered to comprise two quadrature components $I_5$ and $I_6$ along the $xG-yR-zB$ and $aR-bB-cG$ axes, respectively. The phases of the 7.2 megacycle reference signals applied to the control electrodes of the tubes 35, 39 preferably are so selected that the primary current components developed at the anodes of the tubes 35, 39 may be represented by quadrature-current components $(1-k)I_3$ and $(1-k)I_4$, respectively, angularly disposed at 45° with respect to the $xG-yR-zB$ and $aR-bB-cG$ axes of the desired current components. The undesired quadrature components derived at the anodes of the tubes 35, 39 are represented by quadrature components $kI_4$ and $kI_3$, respectively. The components $kI_4$ and $kI_3$ will be neglected for the time being. Resolving the subcarrier signal current components $I_5$ and $I_6$ along the axis of component $(1-k)I_3$, the current component $(1-k)I_3$ may be expressed as follows:

$$(1-k)I_3=(1-k)(.707I_5-.707I_6) \quad (2)$$

Similarly, resolving current components $I_5$ and $I_6$ into components along the axis of component $(1-k)I_4$, the component $(1-k)I_4$ may be expressed as follows:

$$(1-k)I_4=(1-k)(.707I_5+.707I_6) \quad (3)$$

By adding Equations 2 and 3, it may be shown that an in-phase addition of current components $(1-k)I_3$ and $(1-k)I_4$ develops an augmented component having the composition of a signal selected along the $xG-yR-zB$ axis as expressed by the following equation:

$$(1-k)(I_3+I_4)=(1-k)1.414I_5 \quad (4)$$

Similarly, by subtracting Equation 2 from Equation 3, it may be shown that an augmented current component having the composition of a signal selected along the $aR-bB-cG$ axis is developed by an in-phase subtraction of component $(1-k)I_3$ from component $(1-k)I_4$:

$$(1-k)(I_4-I_3)=(1-k)1.414I_6 \quad (5)$$

The in-phase addition of current components $(1-k)I_3$ and $(1-k)I_4$ is accomplished in the Fig. 2 embodiment by means of the inductor 47 and condenser 48 which act as a capacitive coupling unit. Current component $(1-k)I_4$ derived at the anode of tube 39 is coupled with a 90° phase lead from the resonant circuit 46 to the resonant circuit 45 where this component, indicated in Fig. 3*a* by broken-line arrow M, combines in phase with the current component $(1-k)I_3$. Accordingly, as indicated by Equation 4, the in-phase addition results in the derivation at output terminals 50, 50 of an augmented current component having an amplitude $(1-k)1.4I_5$ and thus representative of a current component derived along the $xG-yR-zB$ axis. Likewise, the coupling unit 47, 48 translates current component $(1-k)I_3$ derived at the anode of the tube 35 from the resonant circuit 45 to the resonant circuit 46 with a 90° phase lead, as indicated by broken-line arrow N of Fig. 3*a*. This results in the subtraction of current component $(1-k)I_3$ from component $(1-k)I_4$ in a manner indicated by Equation 5. Accordingly, there is derived at output terminals 51, 51 an augmented component having an amplitude $(1-k)1.4I_6$ and thus representative of a current component derived along the $aR-bB-cG$ axis.

Note that the amplitudes $(1-k)1.4I_5$ and $(1-k)1.4I_6$ of the signals derived at terminals 50, 50 and 51, 51, respectively, are 1.4 times as great as the amplitudes of corresponding signals $(1-k)I_5$ and $(1-k)I_6$ which could be derived by adjustment of the phase of the 7.2 megacycle reference signal applied to the tubes 35 and 39 in the Fig. 2 system with the additional modification of omitting the coupling unit 47, 48.

The Fig. 2 system as thus far described provides satisfactory but incomplete axis selection in that an undesired quadrature component is derived at each pair of output terminals 50, 50 and 51, 51. The circuit values of the elements of the Fig. 2 system, however, may be altered to cause the system to provide complete axis selection. To this end, the values of the Fig. 2 system may be altered to provide means for shifting the phase of the current components in one output circuit with respect to the components in the other output circuit sufficiently to provide a linear addition of the two resultant components. The circuit means comprises the resonant circuits 45, 46 and the coupling unit 47, 48 when the resonant circuits 45, 46 are tuned slightly below the frequency of the chrominance-signal subcarrier.

Figure 3B:
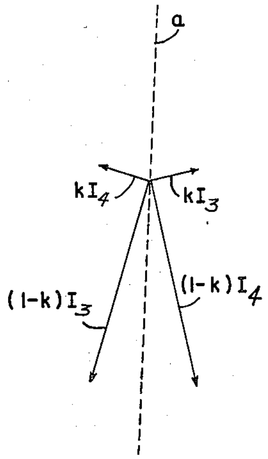

The Fig. 2 system then operates in the following manner. The current components $(1-k)I_4$ and $kI_3$ derived at the anode of tube 39 are shifted by more than 90° by means of the coupling unit 47, 48 and resonant circuit 46 when translated through the coupling unit 47, 48 to resonant circuit 45 with the result that the phase-shifted current component $(1-k)I_4$ represented in Fig. 3*b* and component $kI_4$ derived at the anode of tube 35 add vectorially to provide a resultant along axis *a* represented in broken line in Fig. 3*b*. Similarly, curent component $(1-k)I_3$ derived at the anode of tube 35 and phase-shifted current components $kI_3$ add vectorially to develop a resultant along axis *a* of Fig. 3*b*. The two resultant components along axis *a* add linearly to develop a current component which has an amplitude approximately equal to the sum of the components $(1-k)I_3$ and $(1-k)I_4$. The resultant current derived at output terminals 50, 50, therefore, is an augmented current component of amplitude approximately equal to $(1-k)1.4I_5$ and representative of the current derived along the $xG-yR-zB$ axis. There is no quadrature-current component developed at output terminals 50, 50.

Figure 3C:
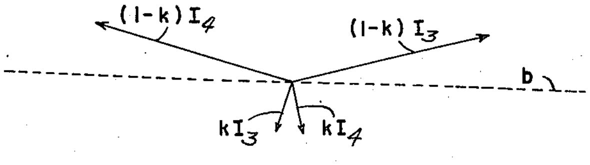

In a similar manner and as represented in Fig. 3*c*, current component $(1-k)I_3$ and component $kI_4$ derived at the anode of tube 35 are phase-shifted by more than 90° by means of coupling unit 47, 48 and resonant circuit 45 when translated through the coupling unit 47, 48 to the resonant circuit 46. Current components $kI_3$ and $(1-k)I_3$ and components $(1-k)I_4$ and $kI_4$, represented in Fig. 3*c*, add vectorially to provide resultants of opposite polarity along axis *b*. The algebraic sum of these resultant components is a current component having an amplitude approximately equal to the component $(1-k)I_4$ less the component $(1-k)I_3$. Accordingly, there is derived along the axis *b* an augmented current component having a value approximately equal to $(1-k)1.4I_6$ and representative of the current component along the $aR-bB-cG$ axis. Accordingly, there is developed at output terminals 51, 51 an augmented current component representative of current component along the $aR-bB-cG$ axis with no quadrature component. In this manner, the Fig. 2 system is capable of providing complete axis selection.

From the foregoing description it will be apparent that a chrominance-signal component-selection system constructed in accordance with the invention has the advantage of being of simple and inexpensive construction and yet capable of providing increased gain.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver, a system for selecting one or more chrominance-signal components along predetermined axes of a received chrominance subcarrier signal comprising: circuit means for supplying a chrominance subcarrier signal; phase-selective circuit means coupled to said supply circuit means and having a pair of output circuits for developing in said output circuits phase-selected current components representative of chrominance-signal components derived along a first set of predetermined axes of said subcarrier signal; and circuit means for intercoupling said output circuits for providing such a phase shift of each of said current components with respect to the other as to effect linear algebraic additions of in-phase components jointly representative of chrominance-signal components derived along a second set of predetermined axes of said subcarrier signal to develop one or more augmented current components representative of said chrominance-signal components derived along said second set of predetermined axes of said subcarrier signal.

2. In a color-television receiver, a system for selecting one or more chrominance-signal components along predetermined axes of a received chrominance subcarrier signal comprising: first circuit means for supplying a chrominance subcarrier signal; second circuit means for supplying a reference signal having a frequency equal to an integral multiple of the frequency of said subcarrier signal; circuit means coupled to said first and second circuit means and having a pair of output circuits for developing in said output circuits current components representative of chrominance-signal components derived along a first set of predetermined axes of said subcarrier signal; and circuit means for intercoupling said output circuits for providing such a phase shift of each of said current components with respect to the other as to effect linear algebraic additions of in-phase components jointly representative of chrominance-signal components derived along a second set of predetermined axes of said subcarrier signal to develop one or more augmented current components representative of said chrominance-signal components derived along said second set of predetermined axes of said subcarrier signal.

3. In a color-television receiver, a system for selecting one or more chrominance-signal components along predetermined axes of a received chrominance subcarrier signal comprising: first circuit means for supplying a chrominance subcarrier signal; second circuit means for supplying a reference signal having a second-harmonic frequency relation to said subcarrier signal; circuit means coupled to said first and second circuit means and having a pair of output circuits for developing in said output circuits current components representative of chrominance-signal components derived along a first set of predetermined axes of said subcarrier signal separated by a predetermined angle; and circuit means for intercoupling said output circuits for providing a phase shift substantially equal to said predetermined angle for each of said current components with respect to the other to effect linear algebraic additions of in-phase components jointly representative of chrominance-signal components derived along a second set of predetermined axes of said subcarrier signal to develop one or more augmented current components representative of said chrominance-signal components derived along said second set of predetermined axes of said subcarrier signal.

4. In a color-television receiver, a system for selecting one or more chrominance-signal components along predetermined axes of a received chrominance subcarrier signal comprising: first circuit means for supplying a chrominance subcarrier signal; second circuit means for supplying a reference signal having a frequency equal to an integral multiple of the frequency of said subcarrier signal; electrode-controlled circuit means coupled to said first circuit means and having gain-control means coupled to said second circuit means for varying the gain in accordance with said reference signal and having a pair of output circuits for developing current components representative of chrominance-signal components derived along a first set of predetermined axes of said subcarrier signal; and circuit means for intercoupling said output circuits for providing such a phase shift of each of said current components with respect to the other as to effect linear algebraic additions of in-phase components jointly representative of chrominance-signal components derived along a second set of predetermined axes of said subcarrier signal to develop one or more augmented current components representative of said chrominance-signal components derived along said second set of predetermined axes of said subcarrier signal.

5. In a color-television receiver, a system for selecting one or more chrominance-signal components along predetermined axes of a received chrominance subcarrier signal comprising: circuit means for supplying a chrominance subcarrier signal; phase-selective circuit means coupled to said supply circuit means and having a pair of output circuits tuned approximately to the frequency of said subcarrier signal for developing in said output circuits phase-selected components derived along a first set of predetermined axes of said subcarrier signal; and circuit means for intercoupling said output circuits for providing such a phase shift of each of said current components with respect to the other as to effect linear algebraic additions of in-phase components jointly representative of chrominance - signal components derived along a second set of predetermined axes of said subcarrier signal to develop one or more augmented current components representative of said chrominance-signal components derived along said second set of predetermined axes of said subcarrier signal.

6. In a color-television receiver, a system for selecting one or more chrominance-signal components along predetermined axes of a received chrominance subcarrier signal comprising: circuit means for supplying a chrominance subcarrier signal; phase-selective circuit means coupled to said supply circuit means and having a pair of output circuits for developing in said output circuits phase-selected current components in quadrature-phase relation and representative of chrominance-signal components derived along a first set of predetermined axes of said subcarrier signal; and frequency-responsive circuit means including said output circuits for providing a quadrature-phase shift of each of said current components with respect to the other and for combining linearly each current component with the other phase-shifted current component to develop augmented current components representative of chrominance-signal components derived along a second set of predetermined axes of said subcarrier signal which is phase-shifted from said first set of axes.

7. In a color-television receiver, a system for selecting one or more chrominance-signal components along predetermined axes of a received chrominance subcarrier signal comprising: circuit means for supplying a chrominance subcarrier signal; phase-selective circuit means coupled to said supply circuit means and having a pair of output circuits for developing in said output circuits phase-selected primary current components representative of chrominance-signal components derived along a first set of predetermined axes of said subcarrier signal; said phase-selective circuit means also being effective to derive in said output circuits secondary current components quadrature-phase displaced from said primary components; and frequency-responsive circuit means for combining the current components derived in said output circuits and including means comprising said output circuits for shifting the phase of the current components in one output circuit with respect to the current components in the other output circuit sufficiently to provide a linear addition of the two resultant components for developing augmented current components representative of chrominance-signal components derived along a second set of predetermined axes of said subcarrier signal which is phase-shifted from said first set of axes substantially to eliminate resultant undesired quadrature components in each output circuit.

References Cited in the file of this patent

UNITED STATES PATENTS

| | | |
|---|---|---|
| 2,451,347 | McShan | Oct. 12, 1948 |
| 2,538,494 | Barton | Jan. 16, 1951 |
| 2,752,420 | Ehrich | June 24, 1956 |
| 2,790,847 | Houghton | Apr. 30, 1957 |